(12) United States Patent
Godbaz et al.

(10) Patent No.: US 9,182,492 B2
(45) Date of Patent: Nov. 10, 2015

(54) APPARATUS AND METHOD FOR MEASURING THE DISTANCE AND/OR INTENSITY CHARACTERISTICS OF OBJECTS

(75) Inventors: John Peter Godbaz, Hamilton (NZ); Adrian Andrew Dorrington, Hamilton (NZ); Michael John Cree, Hamilton (NZ)

(73) Assignee: Waikatolink Ltd, Hamilton (NZ)

( * ) Notice: Subject to any disclaimer, the term of this patent is extended or adjusted under 35 U.S.C. 154(b) by 398 days.

(21) Appl. No.: 13/321,138

(22) PCT Filed: Jul. 29, 2011

(86) PCT No.: PCT/IB2011/002359

§ 371 (c)(1),
(2), (4) Date: Sep. 14, 2012

(87) PCT Pub. No.: WO2012/014077

PCT Pub. Date: Feb. 2, 2012

(65) Prior Publication Data

US 2013/0116977 A1 May 9, 2013

Related U.S. Application Data

(60) Provisional application No. 61/400,616, filed on Jul. 29, 2010.

(51) Int. Cl.
*G01S 17/89* (2006.01)
*G01S 17/32* (2006.01)
*G01S 7/491* (2006.01)

(52) U.S. Cl.
CPC .................. *G01S 17/89* (2013.01); *G01S 7/491* (2013.01); *G01S 7/4915* (2013.01); *G01S 17/325* (2013.01)

(58) Field of Classification Search
CPC ............ G01C 3/08; G01S 17/10; G01S 7/497
USPC ............. 356/3.01–3.15, 4.01–4.1, 5.01–5.15, 356/6–22, 28, 28.5
See application file for complete search history.

(56) References Cited

U.S. PATENT DOCUMENTS

| 4,743,110 A | 5/1988 | Arnaud et al. |
| 5,534,993 A | 7/1996 | Ball et al. |

(Continued)

FOREIGN PATENT DOCUMENTS

| WO | WO-01/55746 | 8/2001 |
| WO | WO-2004/090568 | 10/2004 |

(Continued)

OTHER PUBLICATIONS

A A Dorrington, M J Cree, A D Payne, R M Conroy and D A Carnegie "Achieving sub-millimetre precision with a solid-state full-field heterodyning range imaging camera" Received Oct. 18, 2006, in final form May 10, 2007 Published Jul. 20, 2007 IOP Publishing.*

(Continued)

*Primary Examiner* — Luke Ratcliffe

(74) *Attorney, Agent, or Firm* — Morrison & Foerster LLP

(57) ABSTRACT

An apparatus for measuring intensity and/or range characteristics of an object(s), comprising: a signal source to emit modulation signals at a frequency(s); an illuminator to illuminate the object(s) by a first modulation signal; a sensor comprising a pixel(s), wherein the sensor creates a sampled correlated signal by sampling the correlation of a backscattered signal with a second modulation signal within the pixel; and a processor to determine range/intensity characteristics of component returns within the pixel(s) by comparing sampled correlated signals using measurements(s), wherein the measurement(s) comprise first and second modulation signals having a characteristic(s) selected from: (a) two or more different modulation frequencies, (b) a different modulation frequency(s) and an offset of the correlation waveform, and (c) another different modulation frequency(s) and one selected from: the zeroth spatial frequency of the signal returns versus range and an approximation of the zeroth spatial frequency of the signal returns versus range.

20 Claims, 4 Drawing Sheets

(56) References Cited

U.S. PATENT DOCUMENTS

| | | | |
|---|---|---|---|
| 5,835,199 | A | 11/1998 | Phillips et al. |
| 7,495,748 | B1 | 2/2009 | Sandusky et al. |
| 7,561,255 | B1 | 7/2009 | Billmers et al. |
| 7,697,119 | B2 | 4/2010 | Ikeno et al. |
| 7,995,191 | B1 | 8/2011 | Sandusky |
| 2003/0103211 | A1 | 6/2003 | Lange et al. |
| 2005/0190206 | A1 | 9/2005 | Lang et al. |
| 2007/0076189 | A1* | 4/2007 | Kumagai et al. .............. 356/5.01 |
| 2008/0273758 | A1 | 11/2008 | Fuchs et al. |
| 2010/0258708 | A1 | 10/2010 | Meyers et al. |

FOREIGN PATENT DOCUMENTS

| | | |
|---|---|---|
| WO | WO-2006/031130 | 3/2006 |
| WO | WO-2009/051499 | 4/2009 |

OTHER PUBLICATIONS

Supplementary European Search Report for EP 11811894.2, mailed May 26, 2014, 7 pages.

Cree et al., "The Waikato Range Imager," in Proceedings of Image and Vision Computing New Zealand, Nov. 27-29, 2006, pp. 233-238.

Dorrington et al., "Achieving sub-millimetre precision with a solid-state full-field heterodyning range imaging camera," Measurement Science and Technology (2007) 18:2809-2816.

International Search Report and Written Opinion for PCT/IB2011/002359, mailed Mar. 13, 2012, 11 pages.

* cited by examiner

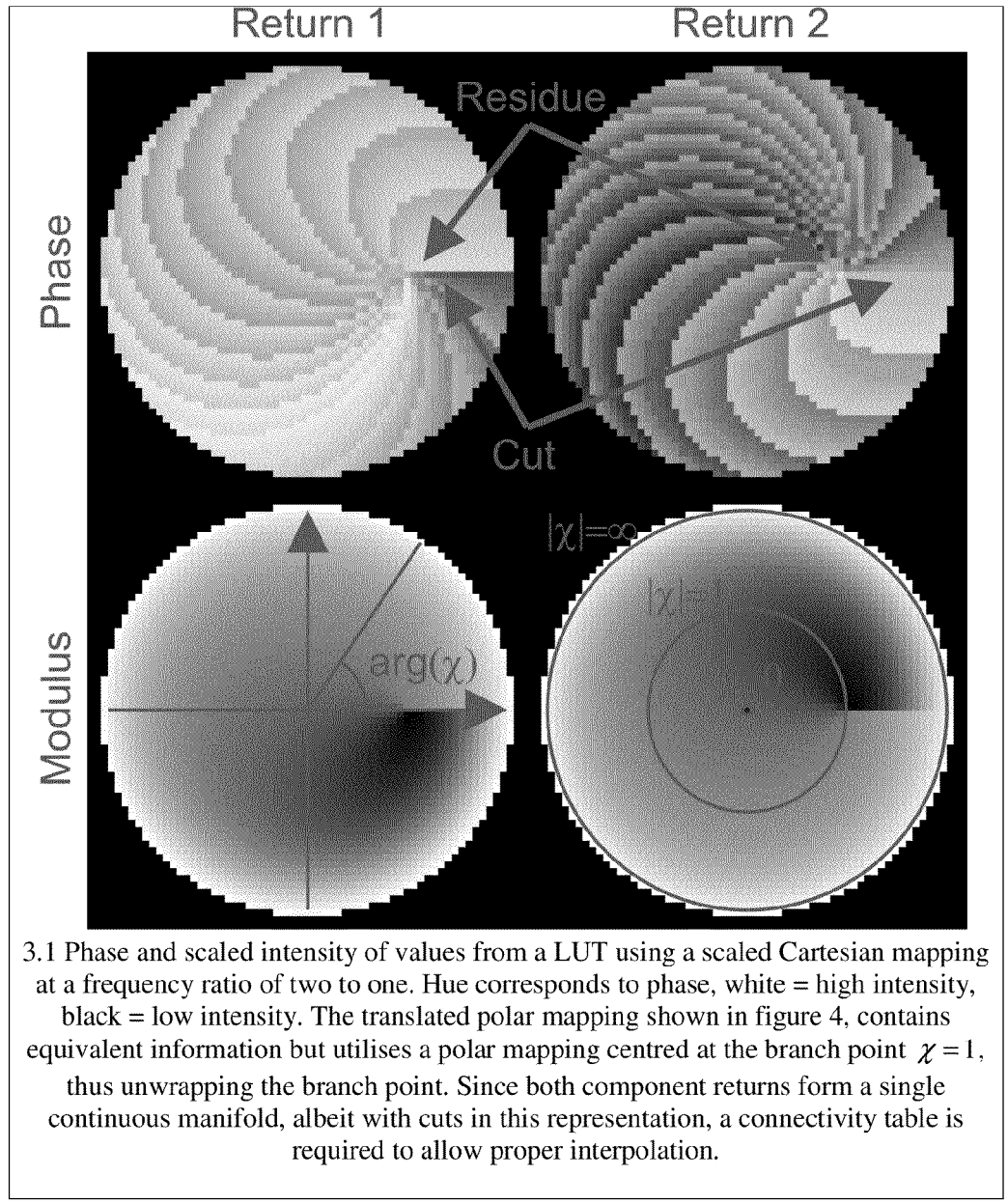

3.1 Phase and scaled intensity of values from a LUT using a scaled Cartesian mapping at a frequency ratio of two to one. Hue corresponds to phase, white = high intensity, black = low intensity. The translated polar mapping shown in figure 4, contains equivalent information but utilises a polar mapping centred at the branch point $\chi = 1$, thus unwrapping the branch point. Since both component returns form a single continuous manifold, albeit with cuts in this representation, a connectivity table is required to allow proper interpolation.

FIGURE 3

4.1 Phase of values from a LUT using a translated polar mapping at a frequency ratio of two to one. Hue is proportional to phase, cyan being a phase of 0. Both component returns are encoded into the same table – for a particular value in the table (first component), the corresponding second component return can be found by adding $2\pi$ to the unwrapped phase around $\chi = 1$.

4.2 Log intensity of values from a LUT using a translated polar mapping at a frequency ratio of two to one. Red = big, blue = small.

FIGURE 4

APPARATUS AND METHOD FOR MEASURING THE DISTANCE AND/OR INTENSITY CHARACTERISTICS OF OBJECTS

CROSS-REFERENCE TO RELATED APPLICATIONS

This application claims the benefit of U.S. Provisional Application No. 61/400,616 filed Jul. 29, 2010, the disclosure of which is incorporated herein in its entirety.

CROSS-REFERENCE TO RELATED APPLICATIONS

This application is the national phase of PCT application PCT/IB2011/002359 having an international filing date of Jul. 29 2011, which benefit of U.S. Provisional Application No. 61/400,616 filed of Jul. 29 2010. The contents of the above patent applications are incorporated by reference herein in their entirety.

FIELD OF THE INVENTION

This disclosure relates generally to intensity and depth/range detection and, more particularly, to a method and apparatus for determining one or more object's intensity and/or range characteristics within a sampling region, integration region, or pixel by taking range and/or active intensity measurements at two or more non-zero frequencies, or by taking one or more measurements at non-zero frequencies plus measuring the zeroth frequency or an equivalent and applying the measurements to a mathematical model using phase and/or intensity normalisation and denormalisation.

BACKGROUND OF THE INVENTION

Range imaging systems based on indirect time-of-flight measurement techniques determine both distance and intensity simultaneously for every pixel in an image. Typically, a scene is illuminated with an intensity modulated light source and the reflected signal is sampled using a gain-modulated (or shuttered) imager. The frequencies used to drive the gain modulation (also called the high-speed shutter) and light source are frequently between 10 MHz and 100 MHz. These systems are capable of effectively measuring the size, shape and location of objects in a scene thereby enabling many applications in areas such as automotive safety and control, multimedia user interface, image segmentation and surface profiling, for example. The parallel nature of the range acquisition allows depth images to be acquired at video frame rates, yet systems can have the flexibility to operate in slower modes to achieve sub-millimeter depth resolution.

A typical Amplitude Modulated Continuous Wave ("AMCW") range imaging system employs, among other elements, a signal source, an illumination system, a sensor, and a processor. The signal source emits two signals, one of which modulates the scene illumination that is reflected by the object/s. The sensor detects the reflected light using the second signal and the processor then calculates the object's distance and/or intensity by analyzing the detected signal.

Methods for analyzing signal measurements are disclosed in, for example, U.S. Pat. No. 7,561,255 to Billmers et al., U.S. Pat. No. 5,835,199 to Phillips et al., and U.S. Pat. No. 5,534,993 to Ball et al., all of which are herein incorporated by reference in their entireties. Also, see International Publication No. 2004/090568 to Donington, International Publication No. 2006/031130 to Carnegie et al., and International Publication No. 2009/051499 to Payne et al., all of which are herein incorporated by reference in their entireties. Methods and apparatuses for detecting and ameliorating signal interference are disclosed in, for example, U.S. Pat. No. 7,697,119 to Ikeno et al., which is herein incorporated by reference in its entirety. A method of three dimensional imaging is disclosed in, for example, U.S. patent application Ser. No. 12/819,602 (U.S. Patent Publication No. 2010/0258708) to Meyers, et al., which is herein incorporated by reference in its entirety.

Typical AMCW lidar systems suffer from a problem known as mixed pixels, multipath or crosstalk. Mixed pixels occur when a single range/intensity measurement is composed of multiple objects at more than one distance from the camera. Multiple objects result in multiple reflected signals, causing phase shifts and intensity changes in the measured backscattered signal and, consequently, erroneous range and intensity values.

SUMMARY OF THE INVENTION

The invention provides an improved method and apparatus for determining the intensity and/or range characteristics of one or more objects within each sampling region, integration region, or pixel. In one embodiment of the invention, a method and apparatus is provided to accurately determine range/phase and intensity properties by substantially decreasing the effects of mixed pixels, multipath, and/or crosstalk. In one embodiment of the invention, an apparatus for measuring at least one of the intensity and range characteristics of at least one object includes a signal source, an illuminator, a sensor, and a processor. In this embodiment, the signal source is operable to emit at least a first and second modulation signal at one or more frequencies, the illuminator is operable to illuminate the at least one object by the first modulation signal, wherein the first modulation signal is backscattered from the at least one object to create a first backscattered signal, the sensor comprises at least one pixel and is operable to create a sampled correlated signal by sampling the correlation of the first backscattered signal with the second modulation signal within the at least one pixel, and the processor is operable to determine the at least one of the range and intensity characteristics of one or more component returns within the at least one pixel by comparing sampled correlated signals using one or more measurements, wherein the one or more measurements comprise first and second modulation signals having one or more characteristics selected from the group consisting of: (a) two or more different modulation frequencies, (b) a first one or more different modulation frequencies and an offset of the correlation waveform, and (c) a second one or more different modulation frequencies and one selected from the group consisting of the zeroth spatial frequency of the signal returns versus range and an approximation of the zeroth spatial frequency of the signal returns versus range.

BRIEF DESCRIPTION OF THE DRAWINGS

The present disclosure contains at least one drawing in color format. Copies of this patent or patent application publication with color drawing(s) may be provided by the Office upon request and payment of the necessary fee.

FIG. 3 illustrates an exemplary LookUp Table for a frequency ratio of two to one, assuming phase and intensity normalisation of the higher frequency measurement by the lower frequency measurement and using a scaled Cartesian mapping, according to an embodiment of the invention.

FIG. 4 illustrates an exemplary LookUp Table for a frequency ratio of two to one, assuming phase and intensity normalisation of the higher frequency measurement by the lower frequency measurement and using the translated polar mapping, according to an embodiment of the invention.

DETAILED DESCRIPTION OF EXEMPLARY EMBODIMENTS

Figure 1:
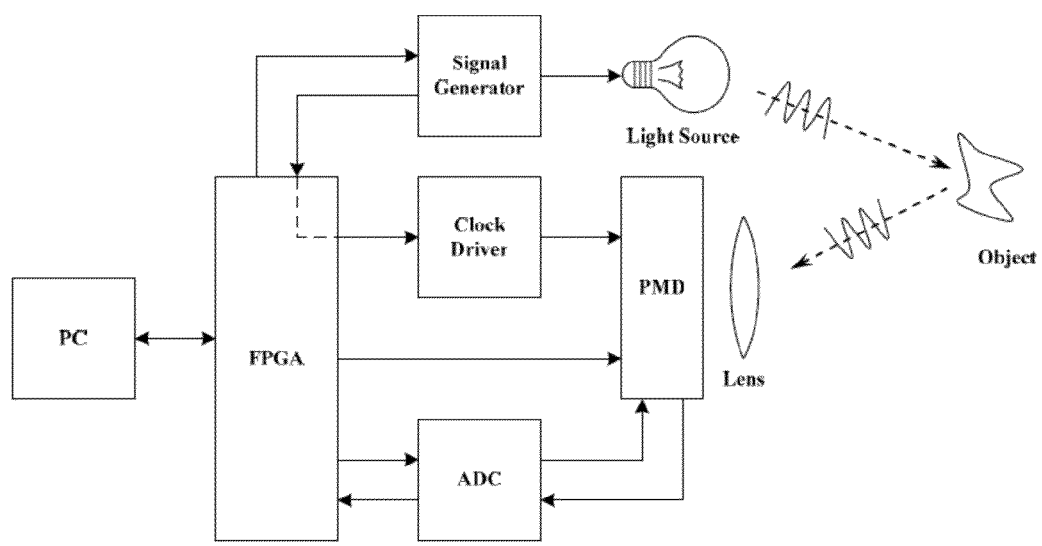
FIG. 1 illustrates an exemplary range imager according to an embodiment of the invention.

In the following description of exemplary embodiments, reference is made to the accompanying drawings which form a part hereof, and in which it is shown by way of illustration, specific exemplary embodiments in which the invention can be practiced. It is to be understood that other embodiments can be used and structural changes can be made without departing from the spirit and scope of the invention.

Although embodiments of the invention may be described and illustrated herein in terms of light detection and ranging ("lidar") systems (for example, laser-based or LED-based detection and ranging systems), it should be understood that embodiments of this invention are not so limited, but may also be applicable to radio detection and imaging systems, or their equivalents. Furthermore, although embodiments of the invention may be described and illustrated herein in terms of AMCW, it should be understood that embodiments of the invention may also be applicable to other modulation methods. Some embodiments of the invention may include other non-lidar systems for measuring two or more frequencies or frequency bins of the Fourier transform of a signal where the location (spatial, temporal or other dimensional) and/or intensity of one or more spikes, peaks or impulses is resolved. This may not only include the one dimensional case, but nth dimensional measurements, locations and/or Fourier transform bins.

AMCW lidar systems use active illumination of a target scene—a signal return is a reflection of this active illumination by a target object which contributes to the AMCW measurement. An ideal AMCW lidar measurement at a particular frequency consists of sampling the spatial Fourier transform of the signal return over range at a corresponding spatial frequency, wherein the signal illuminates a particular integration/sampling region or pixel. The measurement can be notated as either a complex number or as the phase/angle and magnitude of this complex number (also known as the amplitude, modulus or "active intensity"). In the ideal single return case, phase is proportional (or in some cases negatively proportional) to range. Typically, the measurement is calculated using a particular frequency bin of the discrete Fourier transform of the sampled AMCW correlation waveform, although other embodiments are possible.

As used herein, measurement can be understood to include both calibrated and uncalibrated measurements at any frequency. Calibrated measurements may be corrected for, but not limited to, systematic phase shifts, harmonic aliasing, non-linearity, dark current, pixel gain characteristics/bias/ variation and any other systematic errors or other artifacts. In some embodiments measurements may be produced by utilizing techniques such as harmonic cancellation. The term measurement may include the use of any other techniques that produce equivalent or similar results. Harmonic aliasing results in a non-linear measurement response, which results in erroneous phase and/or intensity values.

As used herein, amplitude, intensity, active intensity, active brightness, modulus, complex modulus and magnitude are considered to be synonymous and can be understood to refer to the intensity of the active illumination signal returned to the sensor device after reflecting off an object and refers to the modulus of a complex domain range measurement. An active intensity image is similar to a monochrome image of a scene. Among other uses, it allows the application of traditional image processing techniques to range images.

For ideal measurements within an unknown distance containing a single component return with no aliasing of correlation waveform harmonics, phase/phase angle may be considered a linear function of range. Thus references to a determination of range herein may sometimes be considered to imply the determination of the phase of a component return and vise-versa.

As used herein, "total integrated intensity" can be understood to refer to the sum of all the samples of the AMCW correlation waveform over a phase cycle. Total integrated intensity is equivalent to sampling the zeroth spatial frequency of the active signal returns plus an offset that results from the contribution of ambient light. In some commercial systems, such as the Mesa Imaging Swissranger SR4000, a differential measurement system may be used to remove the offset from ambient light. This makes measurement of the zeroth spatial frequency extremely difficult because rather than directly measuring the correlation waveform, two measurements are simultaneously captured with a 180 degree phase offset. The raw value returned is one measurement minus the other, thus removing information regarding the total integrated intensity.

As used herein, references to measurements at the zeroth frequency can be understood to include measuring the total integrated intensity only, or to measuring the total integrated intensity minus the contribution from ambient light, or to measuring the total integrated intensity minus an estimate of the contribution from ambient light, or any similar measurement. In some embodiments, a measurement at the zeroth frequency may be made by taking a normal measurement at a very low frequency (for example, 10 kHz). In this situation, the measurement is adjusted by retaining the modulus and setting the phase to zero, thus approximating a measurement of the zeroth spatial frequency of the component signal returns. In some embodiments, the contribution to the offset of the correlation waveform from ambient light may be recorded by taking a measurement with the illumination disabled or by any other viable method. In some cases, where the contribution from ambient light is low, ambient light may not necessarily be subtracted. In some embodiments, a measurement at the zeroth frequency may be made simultaneously with a measurement at a non-zero spatial frequency—particularly if there is little or no ambient light. In other cases, any or all measurements may be made at once or by alternate equivalent methods not specified.

The mathematical background to this invention and its embodiments is described in further detail in "A New Method for Mixed Pixel Component Recovery," by Godbaz et al., disclosed as Appendix A in Provisional Application No. 61/400,616 and incorporated by reference herein in its entirety.

In one embodiment of the invention, an apparatus for measuring a range associated with an object includes: a first signal source operable to emit electromagnetic signals at one or more frequencies, wherein each electromagnetic signal comprises at least one phasor defining properties of the electromagnetic signal, a second signal source operable to emit electromagnetic signals at one or more frequencies, a sensor configured to measure the phasors of the electromagnetic signals emitted from the object, and a processor operable to calculate the range of the object based on a comparison of a first set of phasors corresponding to a high frequency and a low frequency of the first signal source and a second set of phasors corresponding to a high frequency and a low frequency of the second signal source.

In some embodiments, the first and second signal sources are emitted from one device. In other embodiments, the first and second signal sources are emitted from separate devices.

In one embodiment, two or more measurements may be taken by an AMCW lidar system (or equivalent device) at different known modulation frequencies, most commonly with integer ratio (i.e. a ratio of integers) modulation frequency ratios, although any ratio may be used, depending on the precise application. In some cases a ratio of two to one is used. These measurements generally consist of both magnitude and phase/range components, although in some embodiments magnitude or phase may not be measured for all or some of the modulation frequencies.

All or a subset of the measurements may be normalised relative to either one or more of the measurements in phase and/or magnitude. Normalisation is described in paragraphs [0078] to [0113] and in general does not refer to the operation of complex division (unless both measurements are at the same measurement frequency). Other symmetries in the multipath problem may be exploited in order to further reduce dimensionality or the number of samples. All or a subset of the normalised measurement's may be combined (and optionally reprojected/scaled by mathematical functions) to form an index value. As a convention in the two measurement frequency case, it is typically assumed that the highest frequency measurement is being normalised by the lowest frequency measurement, as this results in less complex LookUp Tables/mathematical models (described in next clause). However, there may be cases where normalisation by the highest frequency measurement is optimal.

In certain embodiments, the index value may be entered into a mathematical model for determining the intensity and/or range characteristics of the target object or objects. A particular model may consist of applying the index value to a lookup table ("LUT") or an interpolated lookup table, passing the index value to a polynomial model or a piecewise polynomial model, or using the index value as input into a mathematical model or other mathematical functions. As used herein, the term "model" should not only be understood to include any of the aforementioned methods of determining intensity and/or range, but also understood to include equivalents. A LUT may be implemented as a matrix or an array in which each dimension corresponds to a dimension of the input values and each element corresponds to a set of output values. In the case of two measurements at non-zero frequencies with both phase and magnitude normalisation, the LUT is 2D—without normalisation the LUT would be 4D. In the case of one measurement at a non-zero frequency and another measurement at a frequency of zero the LUT is 1D, if only the normalised magnitudes are used to calculate the index value. To find the result for a particular value, interpolation may be used between the elements which most closely approximate the actual continuously valued measurement. Interpolation may include any type of interpolation including linear, bilinear, cubic, spline, nth order approaches, etc.

In some embodiments no normalisation may be used and a higher dimensional LUT or mathematical model utilized in lieu of a lower dimensional LUT or mathematical model combined with normalisation/denormalisation.

In one embodiment the model returns one or more candidate solution tuples and optionally other additional data. Each candidate solution tuple consists of range and/or magnitude or any other characteristics of one or more component signal returns (i.e. objects) notated in any form, including, for example, relative range and/or relative magnitude. In some embodiments, candidate returns may be denormalised relative to the same measurements with which the normalisation was performed or relative to other measurements captured at the same or a previous time. In some embodiments, candidate returns may be denormalised by synthetic measurements, for example, or otherwise arbitrarily scaled by a complex coefficient. Then, all or a subset of the candidate solution tuples may be output or passed to additional processing hardware or software.

In some embodiments, component returns may be thresholded so as to limit the number of component returns, thereby addressing a scenario where there are no component returns or no significant component returns.

Any LUT or mathematical model may utilize rotational symmetries to reduce dimensionality. In one embodiment, each candidate solution tuple may correspond to a different location in the table, wherein each location is calculated via an additional mathematical transformation from an initial 'seed' index value.

In one embodiment, two measurements, A and B, are taken at non-zero frequencies with an integer ratio frequency ratio. In this embodiment, measurement A may be normalised by measurement B, both in phase and intensity, and this normalised measurement is transformed into the index value by one of the LUT index projections described below in paragraphs [0102] to [0113] or by any other alternative transformation. The index value is used to access a LUT or mathematical model and a set of complex domain candidate solution tuples are returned. These candidate solution tuples are denormalised by measurement B in both intensity and phase to produce estimates of the phase and/or intensity of up to two component returns which are outputted to hardware or software. In some embodiments, the LUT or mathematical model may be produced by numerically solving an optimization problem for each cell in the LUT, but any method of solving an LUT or mathematical model could be used. In some implementations, the optimisation problem may be structured as finding two component returns for each set of measurements at different frequencies. The solution tuple for each LUT cell may be generated using the Newton-Raphson numerical optimization algorithm to find the phase and magnitude of the component returns which minimize the sum squared error against the normalised measurements corresponding to each LUT cell (given by the index value). Typically, the lower frequency complex domain measurement is assumed to be equal to one (because normalising a measurement in phase and intensity by itself, reduces it to a value of 1) and the higher frequency complex domain measurement is calculated from the phase and intensity normalised higher frequency measurement corresponding to that particular LUT cell index value. Any LUT mapping may be used, some particular mappings are given in clauses [0098] to [0113]. In other implementations, noise effects or perturbations may be taken into account in order to minimise the statistical expectation of error for each cell in the LUT, which may require the problem to be posed differently. There may be multiple solution or local minima, and this may require repeated optimisation attempts in order to produce high quality output. For Cartesian LUT layouts, a connectivity table specifying which pixels are adjacent for interpolation purposes may be required— one way to produce this is to minimise a smoothness constraint in the complex domain using a brute force search over 2×2 or 3×3 pixel regions. The preferred LUT layout for the preferred frequency ratio of 2:1 is translated polar, due to the lack of a requirement for a connectivity table. Producing a continuous, smooth table may be complicated by ambiguity between which component return should be placed where. For a translated polar table, a continuous, smooth table may be produced by sorting the order of each component return by phase and then manually swapping blocks of values—for example, in this case values separated by $2\pi$ in normalised phase, but with the same normalised modulus may be freely swapped. Example LUTs are given in FIG. 4.

In another embodiment, two measurements are taken using a frequency ratio of 2. The index value, $\chi$, is calculated by the higher frequency measurement normalised in phase and amplitude by the lower frequency measurement. A bound on the maximum possible phase perturbation of the brightest component return in the two return case may be calculated by $|\arg(\chi-1)/2|$, or an equivalent LUT or mathematical model. This relative phase bound may be converted to an absolute phase bound by denormalising $\arg(\chi-1)/2$ by the phase of the lower frequency measurement. Thus it is known that the phase of the primary component return is between the phase of the raw, uncorrected measurement and that of the absolute phase bound. A bound on the maximum possible sum of the modulii of the component returns in the two return case may be calculated by denormalising $|\chi-1|+1$ by the intensity of the lowest frequency measurement or an equivalent LUT or mathematical model. A similar bound on the minimum possible sum of the modulii of the component returns may be estimated using a mathematical model taking $\chi$ as an input. For example, an approximate, empirically derived lower bound suitable for values where $|\chi-1|\leq 4$ can be calculated by denormalising $0.3894|\chi-1|^{1.351}+1$ by the intensity of the lowest frequency measurement or any other similar model of this form. Extensions to other frequency ratios may be possible. Other bounds may be estimated, as described below in Paragraphs [0033]-[0039].

A maximum bound on the size of the phase perturbation of the primary component by the secondary component may be calculated by $\frac{1}{2}\cos^{-1}\left(\frac{|\chi|^2 - \sqrt{|\chi|^4 + 8|\chi|^2}}{4}\right).$ A minimum bound on the absolute value of the phase difference between the two components at the lower modulation frequency $$\frac{|\arg(\chi)|}{3}$$

may be calculated. This may be converted to an equivalent range, using the known modulation frequency.

If $|\chi|>1$, a maximum bound on the absolute value of the phase perturbation of the primary component by the secondary may be calculated by $|\arg(\chi)|/2$. If $|\chi|\leq 1$, a maximum bound the absolute value of the phase perturbation of the primary component by the secondary may be calculated by $$\max\left(\frac{\pi}{4}, \frac{|\arg(\chi)|}{3}\right).$$

A minimum bound on the intensity of the second brightest component as a fraction of the brightness of the brightest component may be calculated by $$\left|\frac{|\chi|-1|}{|\chi|+1}\right|$$

or by $$\sin\left(\frac{|\arg(\chi)|}{3}\right).$$

A maximum bound on the absolute value of the phase perturbation of the brightest component may be calculated by $\sec^{-1}(1+|\chi-1|)$.

If $|\chi-1|>1$, then a maximum bound on the absolute value of the phase perturbation of the brightest component may be calculated by $$\frac{1}{2}\cos^{-1}\left(\frac{(|\chi-1|-1)^2 - \sqrt{(|\chi-1|-1)^4 + 8(|\chi-1|-1)^2}}{4}\right).$$

If $|\chi-1|\leq 1$ then the maximum bound on the absolute value of the phase perturbation of the brightest component may be calculated by $$\frac{1}{2}\cos^{-1}\left(\frac{(|\chi-1|-1)^2 + \sqrt{(|\chi-1|-1)^4 + 8(|\chi-1|-1)^2}}{4}\right).$$

If $|\chi-1|>1$, then a minimum bound on the absolute value of the phase of the second brightest component relative to the brightest may be calculated by $$\cos^{-1}\left(\frac{(|\chi-1|-1)^2 - \sqrt{(|\chi-1|-1)^4 + 8(|\chi-1|-1)^2}}{4}\right).$$

If $|\chi-1|\leq 1$ then the minimum bound on the absolute value of the phase of the second brightest component relative to the brightest may be calculated by $$\cos^{-1}\left(\frac{(|\chi-1|-1)^2 - \sqrt{(|\chi-1|-1)^4 + 8(|\chi-1|-1)^2}}{4}\right).$$

Alternately, one or more of $\arg(\chi-1)$, $|\chi-1|$, $|\chi|$ or $\arg(\chi)$ may be used directly as an indicator of how mixed a pixel is.

In another embodiment, multiple measurements are taken at different frequencies. The first complex domain measurement, $p_0$, is taken at a relative frequency of $r_0$. Other measurements may ($p_i$, i=1, 2, 3, . . . ) be taken at corresponding relative frequencies ($r_i$, i=1, 2, 3, . . . ). To determine the phase, amplitude and range spread parameter, the following set of simultaneous equations is solved:

$$p_n = \sum_{m=0}^{M-1} a_v v_m^{r_n}$$

where n is the measurement number (corresponding to 1 for $p_1$, etc.), M is the total number of component returns, m is the current return, $r_n$ is the relative frequency of measurement number n, $a_m$ encodes the intensity of the component return m, $\arg(v_m)$ encodes the phase (and thus range) of the component return m, $|v_m|$ encodes information about how the component return is distributed over range (for example, if the component return is caused by fog, it may be spread over a meter, rather than being a discrete point-source). These simultaneous equations may be solved numerically or by finding a closed form inversion. An example of one such closed form inversion is given in the following paragraph In one such closed-form embodiment, where $r_0=0$; $r_1=1$; $r_2=2$; $r_3=3$, we solve for $a_0$, $a_1$, $v_0$ and $v_1$ by evaluating $(p_0p_2-p_1^2)v_0^2+(p_1p_2-p_0p_3)v_0+(p_1p_3-p_2^2)=0$ for $v_0$ by substitution into the quadratic equation (although any other valid or approximate method will suffice). One of the solutions is then substituted into $$v_1 = \frac{p_1 v_0 - p_2}{p_0 v_0 - p_1}$$

to determine $v_1$. These values are then substituted into $$a_0 = \frac{p_0 v_1 - p_1}{v_1 - v_0}.$$

Finally $a_1$ is determined in a similar manner using $a_1=p_0-a_0$. Thus we have determined the phase, amplitude and range spread parameter for two component returns using four measurements at adjacent frequencies.

In another embodiment, one measurement is taken at a non-zero modulation frequency and another at a frequency of zero. In this embodiment, the index value is generated by normalising the magnitude of the first (non-zero frequency modulated) measurement by the magnitude of the second (zero frequency modulated) measurement. The index value is then transformed by an arccosine function or an equivalent LUT. This results in an output value which bounds the maximum phase perturbation of the brightest component return within a single pixel measurement. The relationship can be given by: max phase perturbation of brightest return=acos (normalised magnitude). Similarly, a minimum bound on the phase of the second brightest component relative to the brightest component may be estimated by: minimum relative phase=acos(2*(normalised magnitude)^2−1). Or, a minimum bound on the relative intensity of the second brightest component as a fraction of the brightness of the brightest component may be calculated by minimum intensity bound=(1−(normalised magnitude))/(1+(normalised magnitude)).

In a further embodiment, two measurements are taken at non-zero modulation frequencies and a third measurement is taken at a modulation frequency of zero (possibly simultaneously with one or more of the non-zero measurements). The index value consists of the modulii of the two non-zero measurements normalised in intensity by the measurement at the zeroth frequency. The index value is passed to either a LUT or a mathematical model and a set of complex domain (either polar or Cartesian) candidate solution tuples are returned. The candidate solution tuples are initially denormalised by the first non-zero measurement in both phase and intensity and then output. In one variation of this embodiment, a solution tuple may be directly calculated using the following system of equations, which are described in further detail in "A New Method for Mixed Pixel Component Recovery," by Godbaz et al., disclosed as Appendix A in Provisional Application No. 61/400,616 and incorporated by reference herein in its entirety.

Symbols: $r_a$=Measurement A Relative Frequency.
$r_b$=Measurement B Relative Frequency.
$t_a$=Measurement A Modulus Normalised by Modulus of Zeroth Freq. Measurement (attenuation ratio A).
$t_b$=Measurement B Modulus Normalised by Modulus of Zeroth Freq. Measurement (attenuation ratio B).
θ=Phase Offset of Second Component Return Relative to the First Component Return.
b=Relative Intensity of Second Component Return (defined so that the first is 1)
$T_n(x)$=Chebyshev Polynomial of the First Kind, Degree n.

All common factors have been removed from the relative frequencies $r_a$ and $r_b$.

From basic principles, an attenuation ratio at a particular frequency ($r_a$ for this example) can be modeled in the two component return case by $$t_a = \frac{|1 + be^{j\theta r_a}|}{1 + b}$$

From this, using the law of cosines it can be determined that $$1+b^2+2b\cos(r_a\theta)=t_a^2(1+b)^2$$

By combining equation [0056] for two measurements at different frequencies ($r_a$ and $r_b$) and rewriting the cosines of theta using Chebyshev polynomials, it can be found that $$(1-t_b)\cdot T_{r_a}(\cos(\theta))-(1-t_a)\cdot T_{r_b}(\cos(\theta))+(t_a+t_b)\cdot(t_b-t_a)=0$$

In an embodiment where $r_a=1$ and $r_b=2$ (i.e., a 2:1 relative frequency ratio) and using the appropriate closed form inversion formula (for 2:1 ratio, this is the quadratic formula) θ is calculated by:

$$\theta = \pm\arccos\left(-\frac{(1+t_b^2-2t_a^2)}{2(1-2t_a^2)}\right)$$

Where: ±represents either addition or subtraction. Due to the nature of the arccosine function, there is an inherent ambiguity in the sign.

In some implementations when $t_a$ approaches 1, θ may be assumed to be 0. Other implementations may limit the influence of noise by explicitly constraining $t_a$ and $t_b$ to be below 1.

In this embodiment, b is calculated by solving a rearrangement of equation [0056].

$$b^2 - \frac{b\cdot(2(\cos(r_a\theta))-2t_a^2)}{t_a^2-1} + 1 = 0$$

Thus, b is:

$$b = \frac{t_a^2 - \cos\theta \pm \sqrt{(1-\cos\theta)\cdot(2t_a^2 - \cos\theta - 1)}}{(1-t_a^2)}$$

Given θ and b, a normalised candidate solution tuple at a relative frequency of $r_a$ may be calculated by:

$$\left(\frac{1}{1+b\cdot e^{j\cdot\theta\cdot r_a}}, \frac{b\cdot e^{j\cdot\theta\cdot r_a}}{1+b\cdot e^{j\cdot\theta\cdot r_a}}\right)$$

Where: $j=\sqrt{-1}$.

Because of the ambiguity in the sign of θ, there may be multiple possible candidate solution tuples. Depending on the embodiment, either both candidate solution tuples may be output or one may be determined to be correct—one embodiment of a method of such determination is given in section 1.8 of Godbaz et al., disclosed as Appendix A to Provisional Application No. 61/400,616 and incorporated by reference herein in its entirety. In another embodiment each candidate solution tuple may then be denormalised by measurement A in both modulus and phase to give the final output tuples. Each final output tuple gives the range and intensity of the two component returns. In other embodiments a solution tuple may be produced at a relative frequency of 1, denormalised by measurement A and then be phase shifted by $2\cdot\pi\cdot m/r_a$, where m is an integer. In some embodiments m may be determined by the solution tuple's relationship with measurement B. In some embodiments, measurement A and measurement B may be interchanged in the algorithm described above.

FIG. 1 illustrates a block diagram of an exemplary range imager employing a single light source that may be utilized with the invention, in accordance with one embodiment. FIG. 1 is offered by way of example only and various embodiments may or may not include some or all of the elements depicted therein. The range imager of FIG. 1 is described below, and in further detail in "Range Imager Performance Comparison in Homodyne and Heterodyne Operating Modes," by Conroy et al., disclosed as Appendix B to Provisional Application No. 61/400,616 and incorporated by reference herein in its entirety. Further, the invention is not limited to the range imager of FIG. 1 and may be utilized in any other range imagers known in the art.

The range imager illustrated in FIG. 1 includes a photonic mixer device ("PMD") sensor for sampling the spatial Fourier transform of the signal returns within each sampling/integration region over the scene and the PMD sensor may be controlled by a field programmable gate array ("FPGA"). The PC interface may be used for system control and data transfer. Sensor control and readout signals may be interfaced directly to the FPGA and additional external circuitry may be used for driving the pixel modulation clocks and converting analog pixel outputs to digital domain. As used herein, "sampling region," "integration region," and "pixel" are interchangeable and may be considered synonymous for the purposes of this application.

The FPGA can perform two main functions. First, it generates all the necessary signals to drive the PMD sensor and read data back from the analog to digital converter ("ADC") and second it provides a control and data-path interface between the system and PC. The other function of the FPGA firmware may be to provide a communications interface between the system and a PC. A simple command protocol might be used in order to issue basic instructions and program various registers or settings from a PC. In some embodiments, each command consists of a single alphabetic character to identify the instruction, followed by any required arguments. Key commands may include setting the mode of operation (heterodyne or homodyne), the integration time, number of frames to capture and the region of interest, as well as instructions to start a capture or read measured data. On the PC side, a basic Matlab software interface may be written to issue these commands and to appropriately manage data collection. Matlab may also be used for all data processing and analysis. However, any suitable software or programming language could be used.

In some embodiments, the signal generator outputs two signals at known, adjustable frequencies with specified phase relationship between the two signals. One signal may be used to modulate a bank of LEDs, although any illumination source that can be modulated at high frequency can be used, including, for example, lasers. The second signal is used to modulate the PMD sensor. The PMD sensor samples the correlation of the laser modulation signal reflected/backscattered off objects in the scene with the sensor modulation signal over different phase relationships—also referred to as the correlation waveform. In practice, this waveform may be offset by ambient light. In homodyne mode, each integration period has a fixed phase relationship between the two modulation signals; in heterodyne mode, the phase relationship changes during the integration period.

After each integration period, the PMD sensor is read out and the frame data transferred to the PC. In some embodiments, there may be additional intermediate buffering of the data from each frame, intermediate processing or any other equivalent implementation.

In one embodiment, a measurement is made at a particular modulation frequency by the signal generator outputting two signals at the same specified modulation frequency. A series of frame captures occurs with a different phase relationship between the two signals for each capture, typically equally spaced over 0 to 2π. A standard non-zero modulation frequency range measurement is calculated for each pixel in the sensor from the bin corresponding to the fundamental frequency of the correlation waveform (although in some embodiments harmonics of the correlation waveform may be used) of the discrete Fourier transform of each pixel versus frame capture number. A measurement of the total integrated intensity may be captured by summing the series of frame captures over frame capture number. A measurement of the ambient offset in the correlation waveform may be estimated by capturing a frame or series of frames with the active illumination turned off.

In some embodiments, two measurements may be taken by an range-imager at different known non-zero modulation frequencies. There are several ways in which these related range images could be captured, for example two separate captures at different modulation frequencies, one after the other, or both measurements taken at once using harmonics in the AMCW correlation waveform (for example, by reducing the duty cycle of both the laser and intensifier modulation to 25 percent), or alternating between each modulation frequency during the integration period and encoding them in five frames or more. In other embodiments, these methods may be extended to the case of three or more measurements.

A measurement at a particular modulation frequency can be normalised by another measurement at another frequency in either phase or magnitude or both. Relative modulation frequencies are modulation frequencies scaled so that all common integer factors have been removed from all non-zero modulation frequencies. For example, we may assume that there is a measurement $p_1 \in C$ at a relative modulation frequency of $r_1$ which we wish to be normalised by a measurement $p_0 \in C$ at a relative modulation frequency of $r_0$. While in the examples given, the magnitude and phase normalisations are both relative to the same measurement, magnitude could be normalised relative to one measurement and phase another. The normalised value may be denoted $x_1 \in C$. For the corresponding denormalisation, the input value is $y \in C$ and the output is $z \in C$, also requiring the same value ($p_1 \in C$) used for normalisation. Both the values output from the lookup table or model (y) and the final output from the algorithm (z) are at a relative frequency of $r_{LUT}$. The normalisation, denormalisation and LUT mapping operations are notated mathematically in paragraphs [0080] to [0113].

The following equations can be notated or evaluated in Cartesian form or any other mathematically equivalent notation but for clarity we notate the normalisation/denormalisation in the form of constraints in polar form. If the phase of a complex number has been taken, then it may also be normalised/denormalised without the explicit conversion back to a complex number. The same is true for the modulus.

Magnitude only normalisation (polar form):

$$|x_1| = \frac{|p_1|}{|p_0|}$$

$$\text{Arg}(x_1) = \text{Arg}(p_1)$$

Magnitude only denormalisation (polar form):

$$|z| = |y||p_0|$$

$$\text{Arg}(z) = \text{Arg}(y)$$

Phase only normalisation (polar form):

$$|x_1| = |p_1|$$

$$\text{Arg}(x_1) = \text{Arg}(p_1) - \frac{r_1}{r_0}\text{Arg}(p_0)$$

Phase only denormalisation (polar form):

$$|z| = |y|$$

$$\text{Arg}(z) = \text{Arg}(y) + \frac{r_{LUT}}{r_0}\text{Arg}(p_0)$$

Both phase and magnitude normalisation (polar form):

$$|x_1| = \frac{|p_1|}{|p_0|}$$

$$\text{Arg}(x_1) = \text{Arg}(p_1) - \frac{r_1}{r_0}\text{Arg}(p_0)$$

Both phase and magnitude denormalisation (polar form):

$$|z| = |y||p_0|$$

$$\text{Arg}(z) = \text{Arg}(y) + \frac{r_{LUT}}{r_0}\text{Arg}(p_0)$$

Either all or a subset of the normalised measurements may be used to generate the index value. The index value may be a (possibly complex) scalar or vector produced by any mathematical transformation of the input normalised measurements or a verbatim copy of the normalised input measurements. The index value may be passed directly to a function or model, or used to specify a location in a LUT or multiple locations in a LUT using an additional mathematical transformation.

For example, if there are two measurements $p_1$ and $p_0$ at different modulation frequencies, $p_1$ has been normalised in phase and magnitude by $p_0$ to produce $x_1$ and v is defined as the index value. Normalising $p_0$ by itself gives $x_0=1$, which has no information content and thus gives a dimensionality reduction. A scaling function, H(w), may be utilized, thus reducing the infinite domain of the normalised magnitude to a finite range suitable for use in a lookup table. Alternately, extreme values may be truncated instead. The following exemplar scaling function maps the magnitude of a complex number from $[0,\infty]$ to $[0,2]$:

$$H(w) = \frac{2w}{\pi|w|}(\pi - \tan^{-1}(2|w|, |w|^2 - 1))$$

There are a number of different ways that the index for a lookup table in this particular situation could be calculated—including, but not limited to the following transformations:

Transformation 1 (Scaled Cartesian, see FIG. 3):

$$\upsilon = (\Re(H(x_1)), \Im(H(x_1)))$$

Transformation 2 (Scaled Polar):

$$\upsilon = (H(|x_1|), \text{Arg}(x_1))$$

Transformation 3 (Complex Logarithm—extreme values are truncated):

$$\upsilon = (\Re(\ln(x_1)), \Im(\ln(x_1)))$$

The following two LUT transformations/mappings may represent both component returns on a single smooth manifold without a connectivity table, allowing simpler interpolation schemes. For some implementations, the solution tuple is formed by taking the component return calculated from the LUT cells corresponding to the calculated index value and a second measurement calculated from the LUT cells corresponding to the calculated index value plus an offset. For an example, see FIG. 4 and the explanation of FIG. 4 in clause [0115]. The mappings are most suited to the two to one and three to one ratios, where the highest frequency measurement is being normalised in phase and intensity by the lowest frequency measurement giving only a single candidate solution and single branch point (see FIG. 3 and clause [0115]). Normalisation in phase and intensity by a relative frequency above 1 (assuming no common factors between relative frequencies), results in more than one branch point in the LUT, making it difficult to unwrap around a branch point.

Transformation 4 (Scaled Polar, Shifted/Translated Polar Mapping, see FIG. 4):

$$\upsilon = (H(|x_1-1|), \text{Arg}(x_1-1))$$

Transformation 5 (Complex Logarithm, shifted—extreme values are truncated):

$$\upsilon = (\Re(\ln(x_1-1)), \Im(\ln(x_1-1)))$$

Figure 2:
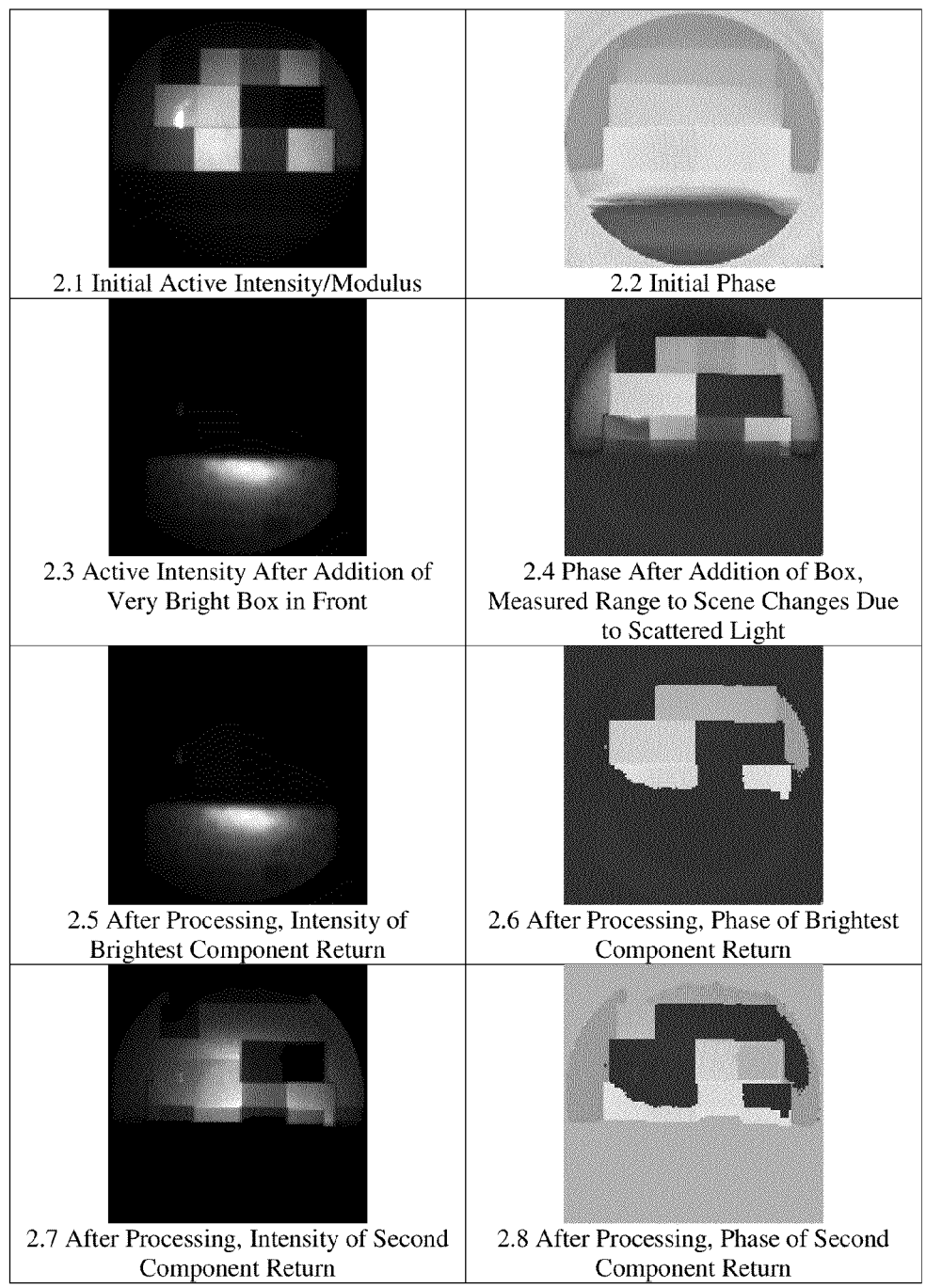
FIG. 2 illustrates an exemplary restoration of two objects according to an embodiment of the invention.

FIG. 2 demonstrates an exemplary restoration using the embodiment from clause [0031] and a scaled Cartesian LUT mapping. In this embodiment of the invention, measurements are taken at two frequencies with a ratio of 2:1 and the range and intensity of up to two component returns/objects are recovered within each pixel. FIGS. 2.1 and 2.2 give active intensity and range measurements of an initial scene, with insignificant mixed pixels from scattered light. Intensity is represented on a scale from black (zero) to white (brightest) and phase is represented using changing hue. The addition of a very bright box (see FIGS. 2.3 and 2.4) results in light from the bright box being scattered across the entire scene. Since the box is several times brighter than the original scene, the original scene is not visible in the intensity image. In the range image, even though most of the original scene has not been obscured by the box, the range measurements have changed due to mixed pixels/multipath caused by light scattered from the object in front by the optics of the AMCW ranger. Light from the object in front thus composes the second component return. By taking another measurement at twice the modulation frequency and applying the algorithm described herein, FIGS. 2.5-8 are produced. Cyan in the phase image represents an insignificantly small or undetectable second return, generally due to points with low reflectivity in the original scene. The algorithm successfully recovers the light scattered onto the original scene by the bright box (purple phase) and the original scene (green through yellow). It is notable that in some regions, depending on the reflectivity of the original scene, the scattered light from the box is in fact brighter than the light from the original scene.

FIG. 3 shows the phase and intensity of a scaled Cartesian layout at a relative frequency of two to one. The two component returns form part of a single continuous manifold and in order to enable correct interpolation at every point it is necessary to have a connectivity table which specifies which component returns to utilize for each location in the table. The measurement at a relative frequency of two, normalised in phase and magnitude by the measurement at a relative frequency of one is represented by $\chi$, the same convention is used for FIG. 4. In FIG. 3 for a particular index value, there is a table for each component return, allowing a solution tuple to be calculated using interpolation. FIG. 4 shows the phase and intensity of a translated polar mapping at a relative frequency of two to one. This is a different manner of representing the same information contained in the LUT from FIG. 3. By unwrapping around the branch point at $\chi=1$, both component returns are represented on the same continuous manifold without cuts requiring the use of a connectivity table. This means that for a particular index value, the first return corresponds to the value in the LUT at the index value, and the second component return corresponds to the value in the LUT at the index value with a $2\pi$ offset in the unwrapped phase dimension (x-axis in FIG. 4, but second dimension in clause [0111]). In other words, the angle/unwrapped phase component of the translated polar mapping sweeps over one component return then the other, making the unwrapped phase dimension of the table $4\pi$ in size. From a connectivity viewpoint, the unwrapped phase forms a loop. In FIG. 4, the y axis is scaled using an arbitrary scaling function but is labeled using the unprojected values for clarity.

The preferred embodiment of this patent consists of the method described in clause [0031] at a frequency ratio of two to one using a translated polar mapping for the LUT as explained in clauses [0099] to [0113], [0115] and shown in FIG. 4. The range-imager makes two complex domain measurements, one for each frequency, which are processed by the algorithm and two complex domain values are output. In order to generate the index value, the highest frequency measurement is normalised in phase and intensity by the lowest frequency measurement. For each mixed pixel consisting of two component returns, the output values each correspond to the range and active intensity of a component return within the pixel/integration region.

The detailed description has described various embodiments with respect to the processing of a single pixel in a full-field system, but could also be applied in other applications, such as to a single point sample from a point scanning system, for example. In addition, the algorithms described herein could be implemented by either hardware (e.g. an FPGA) or software. Also, the processor described herein could be a general purpose computer/PC, microcontroller, ASIC or any other equivalent implementation.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

We claim:

1. An apparatus for measuring at least one of the intensity and range characteristics of at least one object, comprising:
    a signal source operable to emit at least a first and second modulation signal at one or more frequencies;
    an illuminator operable to illuminate the at least one object by the first modulation signal, wherein the first modulation signal is backscattered from the at least one object to create a first backscattered signal;
    a sensor comprising at least one pixel, wherein the sensor is operable to create a sampled correlated signal by sampling the correlation of the first backscattered signal with the second modulation signal within the at least one pixel; and
    a processor operable to determine the at least one of the range and intensity characteristics of two or more component returns within one of the at least one pixel by comparing sampled correlated signals using one or more first measurements, wherein the one or more first measurements result from a system configuration having one or more characteristics selected from the group consisting of:
    (a) first and second modulation signals comprising two or more different modulation frequencies,
    (b) first and second modulation signals comprising one or more different modulation frequencies and an offset of a correlation waveform, and
    (c) first and second modulation signals comprising one or more different modulation frequencies and one selected from the group consisting of a zeroth spatial frequency of the signal returns versus range and an approximation of the zeroth spatial frequency of the signal returns versus range.

2. The apparatus of claim 1, wherein the processor is further operable to determine at least one of the range and intensity characteristics of the two or more component returns within the one of the at least one pixel using two or more measurements at modulation frequencies with an integer ratio frequency ratio.

3. The apparatus of claim 1, wherein the processor is further operable to determine at least one of the range and intensity characteristics of two or more component returns within the one of the at least one pixel using the one or more first measurements at a non-zero modulation frequency and one selected from the group consisting of a measurement of the zeroth spatial frequency, an approximation of the measurement of the zeroth spatial frequency, and an equivalent of the measurement of the zeroth spatial frequency.

4. The apparatus of claim 1, wherein the processor is further operable to normalise the one or more first measurements in at least one of phase and magnitude by one or more second measurements.

5. The apparatus of claim 4, wherein the processor is further operable to calculate a reference value by applying the one or more normalised measurements to one selected from the group consisting of a reference data matrix, a mathematical model, and a function.

6. The apparatus of claim 5, wherein the processor is further operable to generate a solution tuple by denormalising the reference value with the one or more second measurements in at least one of phase and magnitude.

7. The apparatus of claim 6, wherein the processor is further operable to provide an approximation of at least one of the range and intensity of two or more component returns within the one of the at least one pixel based on at least one of the denormalised measurements, the solution tuples, and the reference values.

8. The apparatus of claim 4,
wherein the one or more first measurements comprise a modulation signal at a first non-zero modulation frequency and the one or more second measurements comprise a modulation signal at a second non-zero modulation frequency, wherein the first and second modulation frequencies have an integer ratio frequency ratio,
wherein the processor is further operable to calculate an index value by normalising in phase and amplitude the first measurement of the modulation signal at the first non-zero modulation frequency by the second measurement of the modulation signal at the second non-zero modulation frequency,
wherein the processor is further operable to calculate a reference value by applying the index value to a reference data matrix, and
wherein the processor is further operable to calculate the at least one of the range and intensity of the two or more component returns by denormalising the reference value in phase and magnitude by the second measurement of the modulation signal at the second non-zero modulation frequency.

9. The apparatus of claim 1,
wherein the sensor is operable to make multiple measurements at different modulation frequencies with integer ratio frequency ratios, and
wherein the processor is operable to solve a set of simultaneous polynomial equations of the form $$p_n = \sum_{m=0}^{M-1} a_m v_m^{r_n},$$

wherein $p_n$ is complex domain measurement n taken at relative frequency $r_n$, M is the total number of component returns, m is the current return, $a_m$ encodes the intensity of the component return m, $\arg(v_m)$ encodes the phase of the component return m, and $|v_m|$ encodes information about the distribution of the component return over range.

10. The apparatus of claim 1,
wherein the one or more first measurements comprise a modulation signal at a first non-zero modulation frequency and one or more second measurements comprise one selected from the group consisting of (1) the total integrated intensity, (2) the total integrated intensity minus the contribution from ambient light, (3) the zeroth spatial frequency of the signal returns, (4) a modulation signal at a very low modulation frequency, and (5) an equivalent of the total integrated intensity,
wherein the processor is further operable to calculate an index value by normalising the modulus of the one or more first measurements by the modulus of one or more second measurements,
wherein the processor is further operable to calculate a reference value by applying the index value to one selected from the group consisting of a reference data matrix, a mathematical function, and an operator, and
wherein the processor is further operable to calculate, using the reference value, at least one selected from the group consisting of a bound on the phase perturbation of the brightest component return within the one of the at least one pixel, the phase of two or more component returns within the one of the at least one pixel, the phase relationship between two or more component returns within the one of the at least one pixel, the intensity relationship between two or more component returns within the one of the at least one pixel, the intensity of two or more component returns within the one of the at least one pixel, and an indication of the degree of mixing of component returns within the one of the at least one pixel.

11. The apparatus of claim 1,
wherein the one or more first measurements comprise a modulation signal at a relative frequency of 2 and one or more second measurements comprise a modulation signal at a relative frequency of 1,
wherein the processor is further operable to calculate at least one of (1) a value $\chi$ by normalising the one or more first measurements in phase and intensity by the one or more second measurements, wherein $\chi$ is a value calculated by normalizing the one or more first measurements in phase and intensity by the one or more second measurements, (2) a value $\chi_B$ by denormalising $\chi-1$ in phase and intensity by the one or more second measurements, and
wherein the processor is further operable, using functions of one or more of $|\chi_B|$, $\arg(\chi_B)$, $|\chi-1|$, $\arg(\chi-1)$, and $\arg(\chi)$, to calculate at least one of (1) bounds on at least one of the absolute phase of two or more component returns within the one of the at least one pixel, the relative phase of two or more component returns within the one of the at least one pixel, the intensity of two or more component returns within the one of the at least one pixel, and the relative intensity of two or more component returns within the one of the at least one pixel and (2) calculate an indication of the degree of mixing in the one of the at least one pixel.

12. The apparatus of claim 1, wherein the apparatus further comprises an Amplitude Modulated Continuous Wave range imaging system.

13. A method for measuring at least one of the intensity and range characteristics of at least one object, comprising:
emitting at least a first and second modulation signal at one or more frequencies;
illuminating the at least one object by the first modulation signal, wherein the first modulation signal is backscattered from the at least one object to create a first backscattered signal;
creating a sampled correlated signal by sampling the correlation of the first backscattered signal with the second modulation signal within at least one pixel; and determining the at least one of the range and intensity characteristics of two or more component returns within the one of the at least one pixel by comparing sampled correlated signals using one or more first measurements, wherein the one or more first measurements result from a system configuration having one or more characteristics selected from the group consisting of:
(a) first and second modulation signals comprising two or more different modulation frequencies,
(b) first and second modulation signals comprising one or more different modulation frequencies and an offset of a correlation waveform, and
(c) first and second modulation signals comprising one or more different modulation frequencies and one selected from the group consisting of a zeroth spatial frequency of the signal returns versus range and an approximation of the zeroth spatial frequency of the signal returns versus range.

14. The method of claim 13, wherein the determining the at least one of the range and intensity characteristics of the two or more component returns within the one of the at least one pixel further comprises taking two or more measurements at modulation frequencies with an integer ratio frequency ratio.

15. The method of claim 13, wherein determining the at least one of the range and intensity characteristics of two or more component returns within the one of the at least one pixel further comprises taking the one or more first measurements at a non-zero modulation frequency and one selected from the group consisting of a measurement of the zeroth spatial frequency, an approximation of the measurement of the zeroth spatial frequency, and an equivalent of the measurement of the zeroth spatial frequency.

16. The method of claim 13, wherein determining the at least one of the range and intensity characteristics of two or more component returns within the one of the at least one pixel further comprises normalising the one or more first measurements in at least one of phase and magnitude by one or more second measurements.

17. The method of claim 16, wherein determining the at least one of the range and intensity characteristics of two or more component returns within the one of the at least one pixel further comprises calculating a reference value by applying the one or more normalised measurements to one selected from the group consisting of a reference data matrix, a mathematical model, and a function.

18. The method of claim 17, wherein determining the at least one of the range and intensity characteristics of two or more component returns within the one of the at least one pixel further comprises generating a solution tuple by denormalising the reference value with the one or more second measurements in at least one of phase and magnitude.

19. The method of claim 18, wherein determining the at least one of the range and intensity characteristics of two or more component returns within the one of the at least one pixel further comprises providing an approximation of at least one of the range and intensity of two or more component returns within the one of the at least one pixel based on at least one of the denormalised measurements, the solution tuples, and the reference values.

20. The method of claim 16,
wherein the one or more first measurements comprise a modulation signal at a first non-zero modulation frequency and a one or more second measurements comprise a modulation signal at a second non-zero modulation frequency, wherein the first and second modulation frequencies have an integer ratio frequency ratio,
wherein determining the at least one of the range and intensity characteristics of two or more component returns within the one of the at least one pixel further comprises calculating an index value by normalising in phase and amplitude the first measurement of the modulation signal at the first non-zero modulation frequency by the second measurement of the modulation signal at the second non-zero modulation frequency,
wherein determining the at least one of the range and intensity characteristics of two or more component returns within the one of the at least one pixel further comprises calculating a reference value by applying the index value to a reference data matrix, and
wherein determining the at least one of the range and intensity characteristics of two or more component returns within the one of the at least one pixel further comprises denormalising the reference value in phase and magnitude by the second measurement of the modulation signal at the second non-zero modulation frequency.

* * * * *